May 24, 1938.  E. E. BATES  2,118,065
GAS METER
Filed Oct. 27, 1934
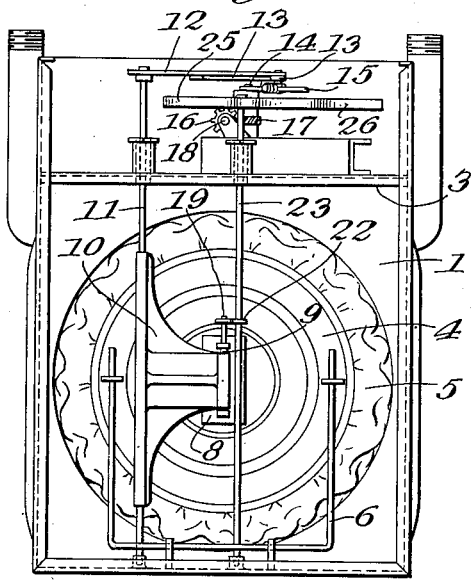
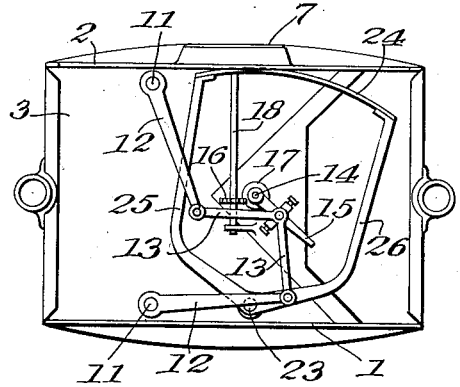
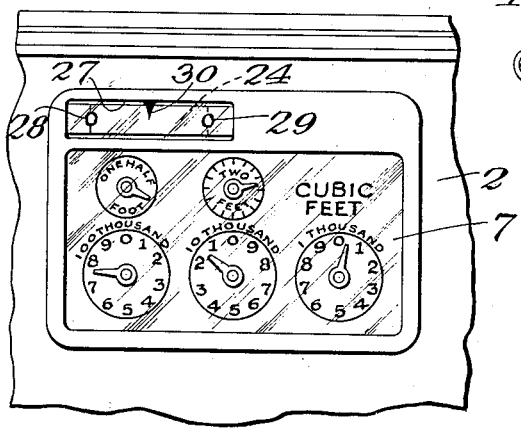
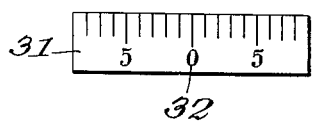
Inventor:
Edmond E. Bates
By Geo. B. Rawlings.
Attorney.

Patented May 24, 1938

2,118,065

UNITED STATES PATENT OFFICE 2,118,065

GAS METER

Edmond E. Bates, Winchester, Mass.

Application October 27, 1934, Serial No. 750,369

12 Claims. (Cl. 73—262)

This invention relates to a device to show the proof of gas meters while operating, and is particularly adaptable to a gas meter of the positive displacement type wherein a displacing diaphragm traverses a chamber to displace gas therein, the volume of gas thus displaced at each stroke of the diaphragm being recorded on an "index" reading in terms of cubic feet.

Gas meters are tested for accuracy before being installed in service. Once installed, there is at present no known means for showing their accuracy in service. In order to check its accuracy the meter must be removed from service, taken to the service station of the gas company, and there tested on a "prover".

To protect the consumer, most States have laws requiring the gas companies to remove and test meters periodically, usually after five to seven years service.

The expense of removing the meter and testing it on the "prover" represents a considerable item. This expense moreover in from sixty to seventy cases out of a hundred, according to statistics, is a needless expense, in that of every one hundred meters removed and tested, only from thirty to forty are shown actually to have gone off proof.

If the proof of every meter could be shown while the meter was in service, the economic waste of needlessly removing and testing the correct meters would be avoided.

Where, as in certain States, the only requirement is that these meters be removed from service, brought in for test, and tested after they have been in service an arbitrary time, for example, five years, either the gas company or the consumer is obviously being subjected to a serious economic loss due to the fact that where a meter is off proof, this fact may not be discovered and usually is not discovered until the time of such test.

According to my invention, the meter is equipped with a device which shows to the meter reader employed by the gas company, or to the consumer, or to both, at all times while the meter is in service whether or not it is correctly registering. This device is a separate unit having no function in the actual measurement of the gas. In order to protect the device from being tampered with, I prefer to place it within the meter where it is protected by the State seal.

I have discovered that any change in the metering conditions from those under which the meter was originally tested is reflected by a change in diaphragm stroke and that therefore it is possible to show the proof of the meter while in service by measuring the stroke of the diaphragm disk. Theoretically the diaphragm stroke is constant, and determined by the setting of the tangent bat. Practically due to meter design, this stroke varies under certain operating conditions. The linkage between the diaphragm disc and its controlling tangent bat, is made up of various members having bending moments, torque, and some play all of which combine to allow the diaphragm travel to fluctuate from its theoretical travel. When operating conditions have changed, due to stuck valves, binds, a change in the flexibility of the leather, etc, the diaphragm travel changes accordingly. Hence, by measuring the actual diaphragm stroke, under operating conditions it is possible to ascertain the meter proof.

The actual measurement of the diaphragm stroke can be accomplished in a variety of ways according to the particular make and design of meter involved. The observation and/or indication of such measurement can be accomplished by standard means of viewing and recording the same but may most conveniently be accomplished by equipping the meter with a tell-tale or indicator which registers any change from the original diaphragm stroke. This tell-tale or indicator can be observed by the consumer or by the meter reader of the gas company, or either of them, and the correctness of the meter thus ascertained without removing the meter from service for a "prover" test.

Thus the essential concept of my invention is that I measure any change from the original stroke of the diaphragm while the meter is in service and provide for observing and/or indicating such change without the necessity for removing the meter for "prover" test.

The diaphragm stroke may be measured either directly from the diaphragm itself or from any moving parts which are actuated by the diaphragm or any linkage actuated thereby or by the diaphragm itself. Where the meter is of the plural type embodying a pair of double acting diaphragms reciprocating in diaphragm chambers of equal volume, my device may be connected to either or both of the diaphragms.

As illustrative of the principles involved, I show in the accompanying drawing one form of my invention which I have found satisfactory under actual service conditions. This disclosure is only suggestive of the many forms that my invention may take and is in no way limiting, since the principles of my invention may be applied in a variety of ways depending upon the construction of the particular meter to be equipped.

In the drawing:—

Fig. 1 is a rear elevation of one form of standard gas meter equipped with an accuracy indicator in accordance with my present invention for measuring the change in stroke of the meter diaphragm in service.

Fig. 2 is a top plan view of Fig. 1, the top of the meter casing being removed.

Fig. 3 is a fragmentary front elevation of the meter illustrated in Fig. 1.

Fig. 4 is a detached view of the separate check up scale piece with which the meter reader is supplied in the event that the accuracy indicator is designed for reading only by the meter reader and not by the consumer.

Fig. 5 is a diagrammatic view of the yoke rod and actuating pin carried by the flag carriage, and Fig. 6 is a side view of Fig. 5.

I have indicated at 1 the rear diaphragm partition, at 2 the front gallery, and at 3 the usual valve table of a meter of standard type. Where the meter is of the double acting diaphragm type the rear diaphragm disc is indicated at 4, Fig. 1, the diaphragm leather at 5 and the guide wire for the diaphragm at 6.

The gas passed by the diaphragm is registered on the index 7 through the usual motion transmitting connections commonly employed in the art. These include a carriage 8 which is soldered to the diaphragm disc, the rock shaft or pin 9 which attaches the carriage to a flag 10, a flag rod 11, the long arm 12 and the short arm 13 of the flag rod, the crank shaft 14 for the tangent 15 and the usual gear and worm driving connections 16 and 17 from the crank shaft of the tangent to the axle 18 of the index 7. The usual meter valves are not shown but occupy the usual position on the valve table 3.

As here shown the flag carriage 8 carries an actuating pin 19 which operates between the opposing arms 20 and 21 of a yoke 22 fast to a yoke rod 23. The yoke rod 23 is journaled vertically of the meter in suitable bearings at the bottom and at the valve table 3 respectively.

Fast to the yoke rod 23 and preferably located in a compartment where there is no live gas, as for example, the compartment above the valve table 3 is a scale 24 for registering any change from the original diaphragm stroke. This scale is preferably developed on a curve as best shown in Fig. 2 and is supported at each end by means of a pair of oppositely disposed arms 25 and 26 which clear the tangent and are directly connected with the yoke rod 23.

The curvature of the yoke arms 20 and 21 is such as to impart the same movement to the scale 24 in any position of contact by the pin 19 and the length of the scale arms 25 and 26 is such that the travel of the pin is magnified or multiplied to a degree whereby the slight movement of the yoke 22 in either direction of oscillation may be conveniently read on the scale.

When the flag rod and flag swing from the direction shown in full lines to that shown in dotted lines in Fig. 5 the pin 19 is caused to travel from one arm 20 to the opposite arm 21 of the yoke. The movement of the pin across the gap between the yoke arms is an idle movement which is ineffective to impart any actuation to the yoke. However, when the pin reaches the dotted line position of Fig. 5 and picks up the yoke arm 21 in approximately the last few hundredths of an inch of its movement, which distance represents the stopping point, so to speak, of the pin travel instead of its idle travel, the yoke and with it the rod is thereby rotated in one direction a distance proportionate to the increase or decrease in the travel of the diaphragm from the original setting and this increase or decrease is registered by means of the scale 24.

The yoke will stay in this position until the pin on its return stroke to the full line position of Fig. 5 again engages the arm 20 of the yoke whereby to rotate the yoke rod 23 in the opposite direction until the pin again stops moving.

The scale 24 is preferably arranged so as to be visible through a sight opening 27 which may be transparently covered if desired and which is preferably mounted in juxtaposition to the index 7. Such sight opening may be conveniently covered by the same transparency which covers the index 7.

In order that the scale 24 may visually indicate the increase or decrease in the travel of the diaphragm, the scale 24 is preferably although not necessarily provided with two zero indications 28 and 29, respectively, see Fig. 3, adjacent either end thereof and readable with reference to a fixed match mark 30 located centrally between said zero indications 28 and 29. If the meter is correctly registering each zero mark 28 or 29 will alternately come to rest at the same point at each half revolution of the meter mechanism, which may be and usually is the match mark 30. If the meter is fast, neither of the indications 28 or 29 will swing up to said mark 30. If the meter is slow, each indication 28 or 29 will alternately swing past said mark 30.

The degree of error may be approximated by observing the relation of travel between the two zero indications, or it may be more accurately determined by means of the separate check up scale piece 31 detailed in Fig. 4. This scale piece is graduated and is intended to be supplied only to the meter reader in installations where it be considered undesirable that the scale 24 be so designed as to enable the consumer himself to check his meter. When the check up scale 31 is used the meter reader simply applies it near the sight opening 27 with the zero indication 32 of said check up scale 31 aligned with the zero indication 28 or 29 of the scale 24 which has come to rest and notes the point on the scale piece 31 at which the other zero indication (28 or 29) comes to rest.

The graduations of the scale piece 31 show the proof of the meter in percentage of correctness. If desired the check up scale 31 may be made of transparent material, as celluloid, so that it may be applied directly over the sight opening 27.

What I therefore claim and desire to secure by Letters Patent is:—

1. The combination with a gas meter, of means for directly indicating the accuracy of the same while the meter is in operation, said meter having means for measuring the amount of gas flowing therethrough which means comprises a movable diaphragm, a register, and connections for operating said register from said diaphragm, and said indicating means comprising a movable element actuated by said measuring means and moved substantially proportionately to the movement of the diaphragm when the diaphragm is nearing each end of its stroke, and signal means actuated by the movement of said element and indicating the length of the diaphragm stroke.

2. The combination of claim 1, said signal means having spaced indications and said gas meter having a fixed indication disposed between said spaced indications and readable with reference thereto.

3. The combination of claim 1, said signal means including a pair of spaced arms and a scale member carried by said arms.

4. The combination of claim 1, said movable element comprising a pin and a yoke cooperating with each other.

5. The combination of claim 1, said movable element comprising a pin and a yoke cooperating with each other, and said signal means including a pair of spaced arms actuated by said movable element and a scale member carried by said arms.

6. The combination with a gas meter having a moving diaphragm and mechanism operated by said diaphragm for registering the amount of gas flowing through the meter, of a device for directly showing while the meter is in operation whether the stroke of such diaphragm has changed from its original setting, said device comprising a member actuated by the movement of the diaphragm and moved substantially proportionately to the movement of the diaphragm when the diaphragm is nearing each end of its stroke, and means controlled by said member for visually indicating the diaphragm stroke and any departure therefrom.

7. The combination with a gas meter having a moving diaphragm and mechanism operated by said diaphragm for registering the amount of gas flowing through the meter, of a device for directly showing while the meter is in operation whether the stroke of such diaphragm has changed from its original setting, said device comprising means actuated by the movement of the diaphragm and moved substantially proportionately to the movement of the diaphragm when the diaphragm is nearing each end of its stroke, and means controlled by said first named-means for visually indicating the starting and stopping points of the diaphragm travel.

8. As an attachment for a gas meter having a register for measuring the amount of gas flowing through the meter and a diaphragm for actuating said register, a device for directly showing while the meter is in operation whether the stroke of the diaphragm has changed from its original setting, said device comprising a movable member actuated by the movement of the diaphragm and moved substantially proportionately to the movement of the diaphragm when the diaphragm is nearing each end of its stroke, and an indicator actuated by said movable member and indicating the length of the diaphragm stroke.

9. In combination, a gas meter having a diaphragm reciprocated by the gas being metered, mechanism for directly indicating while the meter is in operation the amount of the stroke of said diaphragm, comprising means indicating the length of the diaphragm stroke, a yoke connected to said indicating means and having spaced arms, and means operated by said diaphragm to move between the arms to actuate the scale at the ends of the diaphragm stroke.

10. In combination, a gas meter having a diaphragm reciprocated by the gas being metered, mechanism for directly indicating while the meter is in operation the amount of the stroke of said diaphragm, comprising means indicating the length of the diaphragm stroke and means actuated by said diaphragm to move said indicating means, said last-named means including a lost motion connection moving said indicating means only at the ends of the diaphragm stroke.

11. In combination, a gas meter having a diaphragm reciprocated by the gas being metered, an indicator comprising a pointer and a scale cooperating with each other for directly showing while the meter is in operation any change in the diaphragm stroke, means actuated by the diaphragm for operating said indicator including a lost-motion connection operating said indicator only at the ends of the diaphragm stroke.

12. As an attachment for a gas meter having a diaphragm reciprocated by the gas being metered, a device for directly showing while the meter is in operation any change in the diaphragm stroke, said device comprising means indicating the length of the diaphragm stroke, and means actuated by the diaphragm and operating only at the ends of the diaphragm stroke for moving said indicating means.

EDMOND E. BATES.